P. E. FOUCAR.
KNEADING MACHINE.
APPLICATION FILED MAR. 18, 1912.
1,133,274.
Patented Mar. 30, 1915.
2 SHEETS—SHEET 2.
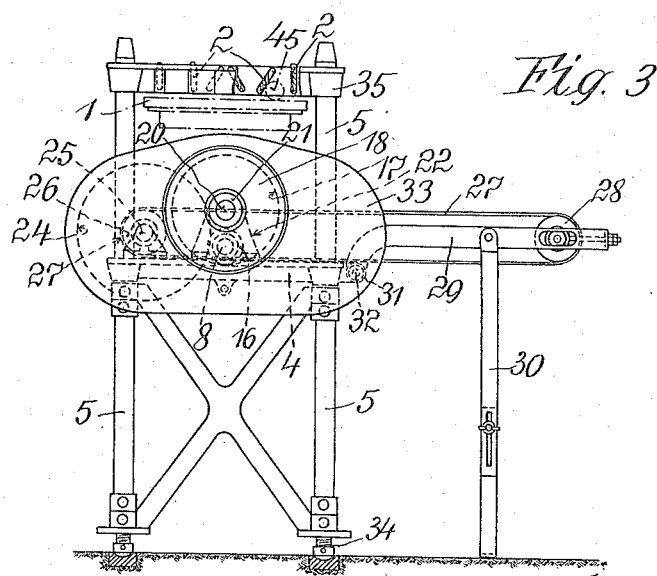
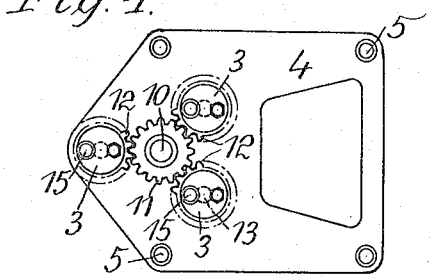
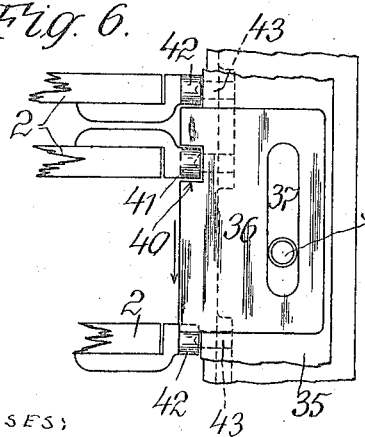
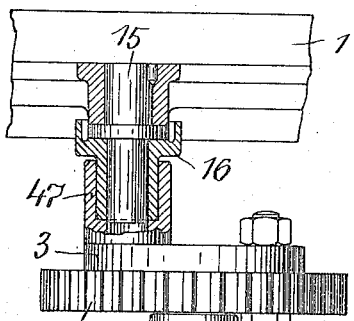
WITNESSES:
John C. Sanders
John A. Percival
INVENTOR:
Ph. Eduard Foucar
BY
ATTY.

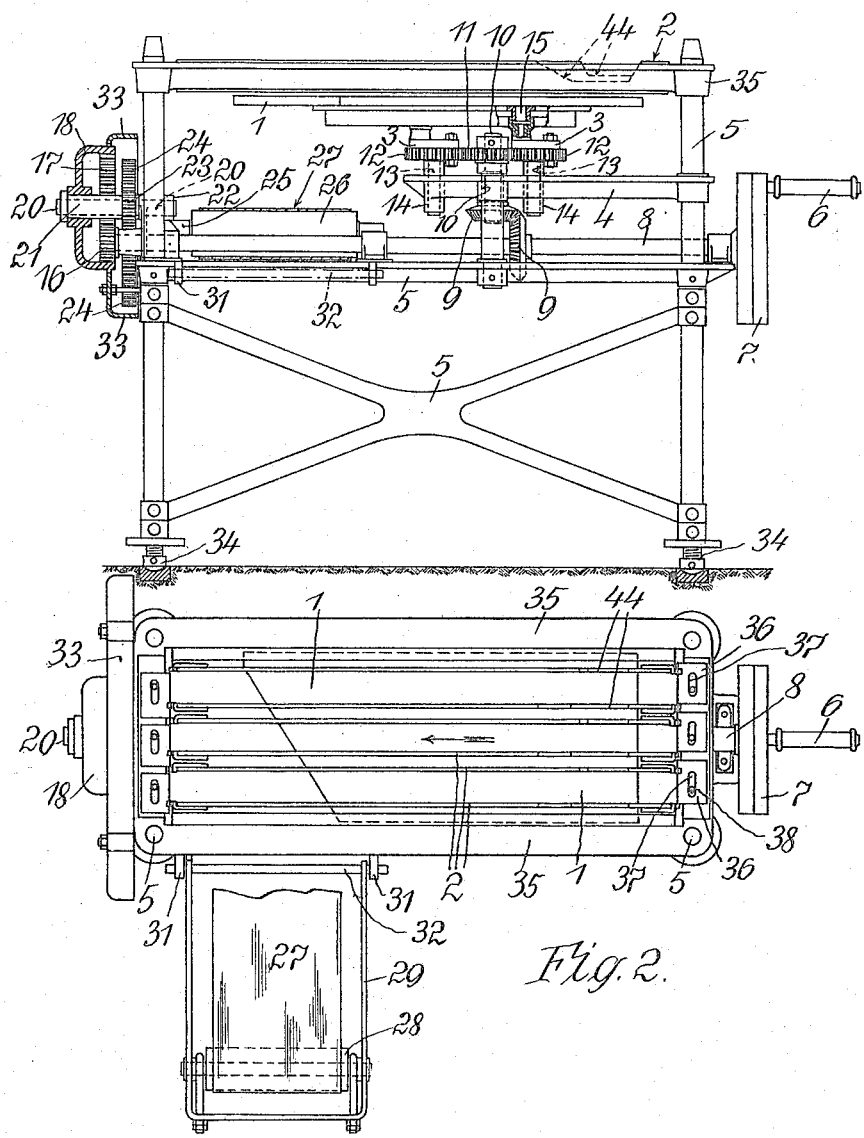

UNITED STATES PATENT OFFICE.

PHILIPP EDUARD FOUCAR, OF DUSSELDORF-OBERBILK, GERMANY.

KNEADING-MACHINE.

1,133,274.   Specification of Letters Patent.   Patented Mar. 30, 1915.

Application filed March 18, 1912. Serial No. 684,472.

*To all whom it may concern:*

Be it known that I, PHILIPP EDUARD FOUCAR, a subject of the German Empire, residing at Dusseldorf-Oberbilk, Germany, have invented certain new and useful Improvements in Kneading-Machines, of which the following is a specification.

This invention relates to a kneading machine for dough or the like, that is to say, it relates to a machine in which irregular shaped pieces of dough or the like are formed into regular ball shaped pieces while simultaneously they are subjected to a kneading action.

Machines of this kind as hitherto known do not entirely replace hand work. It has been impossible for instance to replace the excellent kneading action of the human hand and at the same time to insure a good piece, that is to say a regular ball with a uniform compact structure having an even surface with the exception of the "end."

The object of the present invention is to provide a machine which will work satisfactorily in this respect.

The feature of the novel machine resides in causing a revolving or moving dough table to carry the "lump" or piece alternately against fixed rails or kneading bars arranged in pairs, these bars being located at such intervals that on account of the to and fro movement of the lump caused by the movement of the table, the dough is now pressed substantially transversely against one bar and the next instant is pressed against the next bar so as to roll over the said bars for a short distance.

It is already known to move the "piece" forward while rolling it against a bar, but the novel feature of the present invention resides in causing the piece to roll alternately against two opposite bars or rails and this is produced by the peculiar movement imparted to the table.

Due to the motion of revolution of the table the dough is pressed against the bars simultaneously with the rolling and this is productive of the required kneading effect such as is effected by the hand operation.

The intensity of this kneading action may be regulated by suitable adjustment of the angle of the bars to the face of the table.

Another feature of the present invention resides in setting one rail or bar at a more acute inclination to the plane of the table than the other. This results in causing the piece to move automatically in the direction in which the table tends to carry the piece during the contact of the piece with the bar.

A further feature resides in the provision of means for adjusting the inclination of the table and the bars, which together form the kneading bed, so as to accelerate or retard the kneading process as required.

The invention will be readily understood from the following description of one form, shown by way of example in the accompanying drawings in which:

Figure 1, is a view partly in side elevation and partly in section. Fig. 2, is a plan of the machine. Fig. 3 is an end view showing the upper part of the machine partly broken away and the table in dotted lines. Fig. 4, is a plan of the table support. Fig. 5, is a vertical section through one of the supporting trunnions for the table. Fig. 6, is a view illustrating the method adopted for supporting the working or kneading bars. Fig. 7, is a vertical section through the support for the kneading bars.

In carrying the invention into effect according to the form illustrated, the machine comprises essentially a moving table 1, which is located directly under pairs of fixed bars 2. The table together with the bars form a kneading bed. The table is carried by cranks 3, which are fixed to shafts supported in brackets on an arm 4. The arm 4, is carried by the uprights of the frame 5, of the machine. The table is driven from a hand crank 6, or belt pulley 7, mounted on a shaft 8 supported on the frame of the machine. The shaft 8, drives a vertical shaft 10 through bevel gearing 9. On the vertical shaft 10, there is keyed a toothed wheel 11, which gears with three toothed wheels 12 (see Fig. 4).

The wheels 12, are mounted on short vertical shafts 13, supported in bearings 14, on the arm 4. At the upper side of each wheel 12, there is fixed a crank 3. The crank 3, is fixed by means of a bolt 46 (see Fig. 5) eccentrically on the wheel 12. Such a crank is provided on each of the wheels 12. With this arrangement it will be seen that when the wheel 10 rotates, for instance clockwise, all three wheels 12 will rotate counter-clockwise in Fig. 4. The table 1, is provided with supporting pins or feet 15, which rest in foot-step bearings 16. The foot-step bearings 16, are formed in a hollow cup 14, carried by each crank 3 (see Fig. 5).

The movement of the table 1, is such that all its surfaces move in a circular path corresponding in radius to the radius of the cranks 3. According therefore, to the adjustment of the cranks 3 on the wheels 12, the table 1, would be caused to revolve about a circle of greater or smaller diameter. The adustment is effected in any convenient manner from the bolt 46.

The above described mechanism is that which I prefer to employ and is adapted to give a circular movement to the table. The essential however, is that the movement imparted to the table is one of any regular closed curved form. On the end of the shaft 8, that is to say, on the left hand of Fig. 1, and about the center of Fig. 3, there is mounted a toothed wheel 16, which engages with internal teeth 17, on a wheel 18. The wheel 18, is mounted on a sleeve 21 passing loosely over a spindle 20. The spindle 20 is rigidly fixed in a bearing 22 on the machine frame 5. When the shaft 8, rotates, the wheel 18 and sleeve 21, are also rotated. On the sleeve 21, there is mounted a toothed wheel 23, which engages with a corresponding wheel 24, mounted in a position lower on the machine (see Fig. 3) and nearer the side frame 5, than the wheel 18. The wheel 24, is mounted on a shaft 25, which also carries a roller 26, the roller 26, being arranged transversely between the side frames in Fig. 1 and below the table 1. The table 1, as can be seen in Fig. 2, is in the form of a rectangle with one side cut away at an angle. The roller 26 is located at the same side of the machine as that toward which the cut away side of the table 1, is arranged. On the roller 26, there is mounted a transporting band 27, which also extends over a supporting roller 28 carried by a frame 29. The frame 29 is pivotally mounted about an axis 32 supported in bearings 31. In addition the frame 29, is supported by an adjustable upright 30 (see Fig. 3). The entire driving gear for the transporting band 27 is inclosed by a cover 33. For the sake of simplicity, the part of the supporting band 27 which projects outwardly from the machine is omitted.

The transporting band is provided to receive and transport plates or boards on which the piece of dough is placed after it leaves the table 1. The feet of the machine frame 5 are provided with adjustable screws 34 to enable the machine to be set up as required either in a horizontal or inclined position.

As mentioned above, the table 1, executes its movement of revolution directly below the kneading bars or rails 2. These rails are supported conveniently in a frame 35 made of angle-iron and this frame 35 may form the upper part of the machine frame.

The rails or bars 2, are supported in the frame 35, in such a manner that they may be inclined about a horizontal axis situated about their center or about one end. In this way the bars 2, may be inclined at any desired angle to the plane of the table 1.

To the short transverse lengths of the frame 35, there are fixed angle pieces 36 (see Figs. 6 and 7). The angle pieces 36, are adjustable by virtue of slots 37 through which there pass the fixing bolts or studs 38. A groove 40, is provided on the downwardly depending arm of the angle piece 36 (see Fig. 7) and in this groove there engages a pin or projection on the end of the rail 2. In the form shown, the projection 41, is arranged at the upper end of the rail 2. A second pin or projection 42, fixed to the rail or bar 2, engages with a pivoting point formed on the end of a pin 43, located below the groove 40 on the angle piece 36. It will be seen therefore that on slackening back the nut 39, the angle piece 36, may be moved along the frame 35, owing to the presence of the slot 37. This movement will cause the upper pin 41, of the kneading bar 2 to move with it whereby the bar will be rotated about an axis formed by the projection 42, engaging with the pivoting point on the pin 43.

Although the projection 42, and the bearing pin 43 are provided at each end of the bar 2, the actual adjusting device which embraces the parts numbered 36 to 41 is only arranged at one side of the bar.

In the drawing, Figs. 2 and 6, the adjusting device is alternately arranged on one and the other side for successive pairs of rails. At the end of the rails next to the driving crank 6, suitably shaped incuts 44, are provided which permit of the piece of dough or similar material to be worked being pressed between the corresponding pair of kneading bars and this applies even when the two bars are inclined at fairly acute angles to the plane of the table. This device works as follows: It will be assumed that the table revolves in a counter-clockwise direction in Fig. 2, and that the kneading bars 2, are arranged vertically to the table. The piece 45, see Fig. 3, to be acted upon is first moved and pressed against the right hand bar in Fig. 3, and then against the left hand bar while at the same time it rolls a short distance over the table. In this way the piece is pressed more or less against the bars and is furthermore held by these bars, meanwhile the lower part of the piece which is resting on the table is displaced owing to the movement of the table. The pieces then move from the right toward the left hand bar, whereupon the actions described are repeated but in the opposite direction. The process is then repeated several times.

The periodic rolling effected by the oppositely arranged bars and the displacement of the material for the time being resting on the table produces in the end an action similar to that produced by hand by means of which the pieces form into substantially ball shape with a screwed shaped formation toward one part of the surface forming the end and on this end the piece is rested after the kneading process is finished.

It will be understood that the action described is possible even when the kneading bars are perpendicular to the surface of the table. The action is however considerably accelerated by inclining the bars at a more or less acute angle to the table. In this way the piece comes sooner and remains longer in contact with the bars. The kneading action on the inclined bars is more intensive than on the vertical bars especially the pressing-in action between the inclined bar on the table surface. It is thus possible by adjustment of the inclination of the bars to the table surface to regulate according to requirements the pressure which is exerted by the bars on the dough like mass. The adjustability of the bars also enables the pieces to be fed along the kneading bed without using any special transporting means. It has been found that this transporting action may be produced by inclining one of the bars when the other remains vertical or when both bars are inclined, one bar should be arranged at a more acute angle than the other.

By means of the action described namely, the presence of a greater pressure between the table and the bars according to the increased inclination, the piece is accurately fed along the table in the direction in which the movement of the table tends to carry the piece away from the bar at the most acute angle. In this way it is possible by the adjustment shown in Fig. 1, to obtain three actions, first, both bars 2, may be vertical to the table whereby the dough like mass will be merely worked or kneaded and shaped, secondly, both bars may be arranged at the same angle whereby the kneading action is more intensive and the pieces simultaneously kneaded and shaped. In the third place, the two bars may be arranged at different angles as shown at the extreme right hand of the table in Fig. 3, and in this way the kneading is intensive and the piece is not only formed and kneaded but is moved forward in the direction in which the table tends to move the piece when it is in contact with the more acutely inclined bar. The automatic transporting movement of the piece toward the transporting band 27, would be effected therefore by revolving the table 1, in a counter-clockwise direction while the bars 2, were in the relative position shown in regard to the right hand bar in Fig. 3.

When the machine is in use all the bars should be arranged somewhat in the relative position shown in respect to the right hand bar in Fig. 3.

In Fig. 2, the bars are shown vertical, but in reality they would be displaced somewhat after the manner shown in the right hand bar in Fig. 3. In this way the dough like masses inserted at the openings 44 in Fig. 2, travel accurately from right to left in the direction of the arrow and at the left hand they fall with suitable distances between them, from the table to the transporting band 27.

The fitting of the pieces in the longitudinal direction of the kneading bars 2, may be effected by suitably inclining the entire machine or the feeding action may be accelerated or retarded in the same manner. Thus the feeding action is slower when the machine and all its working parts or more especially the kneading bed is inclined upwardly from the point where the dough is inserted between the bars to the point where the pieces are allowed to fall on to the transporting band. Similarly the feeding action is accelerated by causing the inclination to be a downward one in the direction of the feeding.

It has been found that the inclination of the kneading bed in a direction transverse to the direction of feeding has effect upon the action and forward movement of the piece.

The inclination of the machine in one or other direction is effected by means of the adjustable foot 34.

In the form of the invention chosen for illustration a plurality of pairs of kneading bars are provided.

It will be understood that any suitable number may be provided and the width of the table will be correspondingly altered. The parts are shown in somewhat like the proper proportions for three pairs of bars.

I claim:

1. In combination in a kneading machine, a table adapted to move in its own plane, pairs of bars located above said table and spaced to admit the mass to be kneaded, means for adjusting the inclination of the bars relatively to said table and means for moving said table to cause said mass to press against and roll in contact with one of each pair of said spaced rails alternately.

2. In combination in a kneading machine, a table adapted to move in its own plane, pairs of bars located above said table and spaced to admit the mass to be kneaded and means for moving said table to cause said mass to press against and roll in contact with said spaced rails alternately, one of each pair of said spaced rails being more inclined than the other to cause said mass to move progressively over the table.

3. In a kneading machine in combination, a table adapted to move in its own plane, a pair of bars mounted over said table and having their lower edges substantially parallel thereto, and means for adjusting the inclination of said bars to said table.

4. In combination with a table adapted to move in its own plane, a supporting frame, bars adjustably mounted on said supporting frame, said bars having projections at their ends, pivoting pins on said supporting frames and engaging in projections at opposite ends, a slidable plate mounted on said supporting frame and having a slotted arm located with the slot opposite one end of said bars and a projection on the bars adapted to engage in the slot on said adjustable plate.

5. In combination in a kneading machine adapted to move in its own plane, pairs of bars located above said table, means for inclining said bars to said table and to one another, an incut portion on said bars at one end of said table, said incut portions being arranged to admit the mass to be kneaded, and means for moving said table to cause said mass to press against and roll in contact with one of each pair of said bars alternately.

6. In combination, a table adapted to move in its own plane, supporting pins for said table, cranks carrying said supporting pins, rotatable driven members, means for adjustably fixing said cranks and said rotatable driven members, pairs of bars located above said table and spaced apart to admit the mass to be kneaded and means for adjusting the inclination of said bars to said table.

In testimony whereof I have signed my name to this specification in the presence of two subscribing witnesses.

PH. EDUARD FOUCAR. [L. S.]

Witnesses:
HELEN NUFER,
ALBERT NUFER.

Copies of this patent may be obtained for five cents each, by addressing the "Commissioner of Patents, Washington, D. C."